United States Patent
Makphaibulchoke et al.

(10) Patent No.: US 8,464,024 B2
(45) Date of Patent: Jun. 11, 2013

(54) VIRTUAL ADDRESS HASHING

(75) Inventors: Thavatchai Makphaibulchoke, Fort Collins, CO (US); Linn Crosetto, Fort Collins, CO (US); Raghuram Kota, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1608 days.

(21) Appl. No.: 11/796,665

(22) Filed: Apr. 27, 2007

(65) Prior Publication Data

US 2008/0270738 A1  Oct. 30, 2008

(51) Int. Cl.
*G06F 12/08* (2006.01)
(52) U.S. Cl.
USPC .................................. 711/216; 711/E12.018

(58) Field of Classification Search
None
See application file for complete search history.

(56) References Cited

U.S. PATENT DOCUMENTS

| | | | |
|---|---|---|---|
| 5,724,538 A * | 3/1998 | Morris et al. | 711/206 |
| 6,430,670 B1 * | 8/2002 | Bryg et al. | 711/216 |
| 6,578,131 B1 * | 6/2003 | Larson et al. | 711/216 |
| 6,625,591 B1 * | 9/2003 | Vahalia et al. | 1/1 |
| 6,735,670 B1 * | 5/2004 | Bronstein et al. | 711/108 |
| 7,480,302 B2 * | 1/2009 | Choi | 370/395.32 |
| 7,797,323 B1 * | 9/2010 | Eshghi et al. | 707/737 |
| 2003/0196066 A1 * | 10/2003 | Mathews | 711/207 |
| 2003/0204703 A1 * | 10/2003 | Rajagopal et al. | 711/216 |

* cited by examiner

*Primary Examiner* — Edward Dudek, Jr.
*Assistant Examiner* — Ryan Dare

(57) ABSTRACT

Embodiments include methods, apparatus, and systems for virtual address hashing. One embodiment evenly distributes page-table entries throughout a hash table so applications do not generate a same hash index for mapping virtual addresses to physical addresses.

17 Claims, 2 Drawing Sheets

US 8,464,024 B2

VIRTUAL ADDRESS HASHING

BACKGROUND

Operating systems can execute multiple applications simultaneously each using virtualized address space called virtual memory. With the use of virtual memory, physical memory is divided into chunks which are managed by the operating system.

In order to track the virtual memory locations and physical memory locations, operating systems use a page table to record the temporary assignments of virtual addresses to real addresses. When a processor generates a virtual address to which an executing process requires access, the page table is used to translate the virtual address to the real address.

In a virtual memory environment, as the amount of physical memory in a computer grows, the number of page-table entries that map the virtual to physical addresses also increases. The page-table entries, however, may not be evenly distributed throughout the table. As such, mapping and translation become inefficient and increase execution time of processes.

DETAILED DESCRIPTION

Exemplary embodiments include methods, systems, and apparatus that utilize extended virtual address hashing methods to produce improved page-table entry access with large physical memory sizes. To prevent long overflow chains, an extended overflow hashing function distributes page table entries more uniformly throughout a large hash table in which only its lower section is hashable by a standard hashing function in the common case. The extended overflow hashing function uses the virtual address itself to achieve a more uniform distribution.

In a virtual memory environment, as the amount of physical memory in a computer grows, the possible number of page-table entries that are used to map the virtual to physical addresses also increases. One embodiment uses a hash table implementation of the page table to provide access to the page table entries. Entries in the hash table are evenly distributed throughout the hash table. As such, time spent traversing overflow chains is minimized. To improve performance, the hashing function distributes the page table entries uniformly across the entire hash table.

Figure 1:
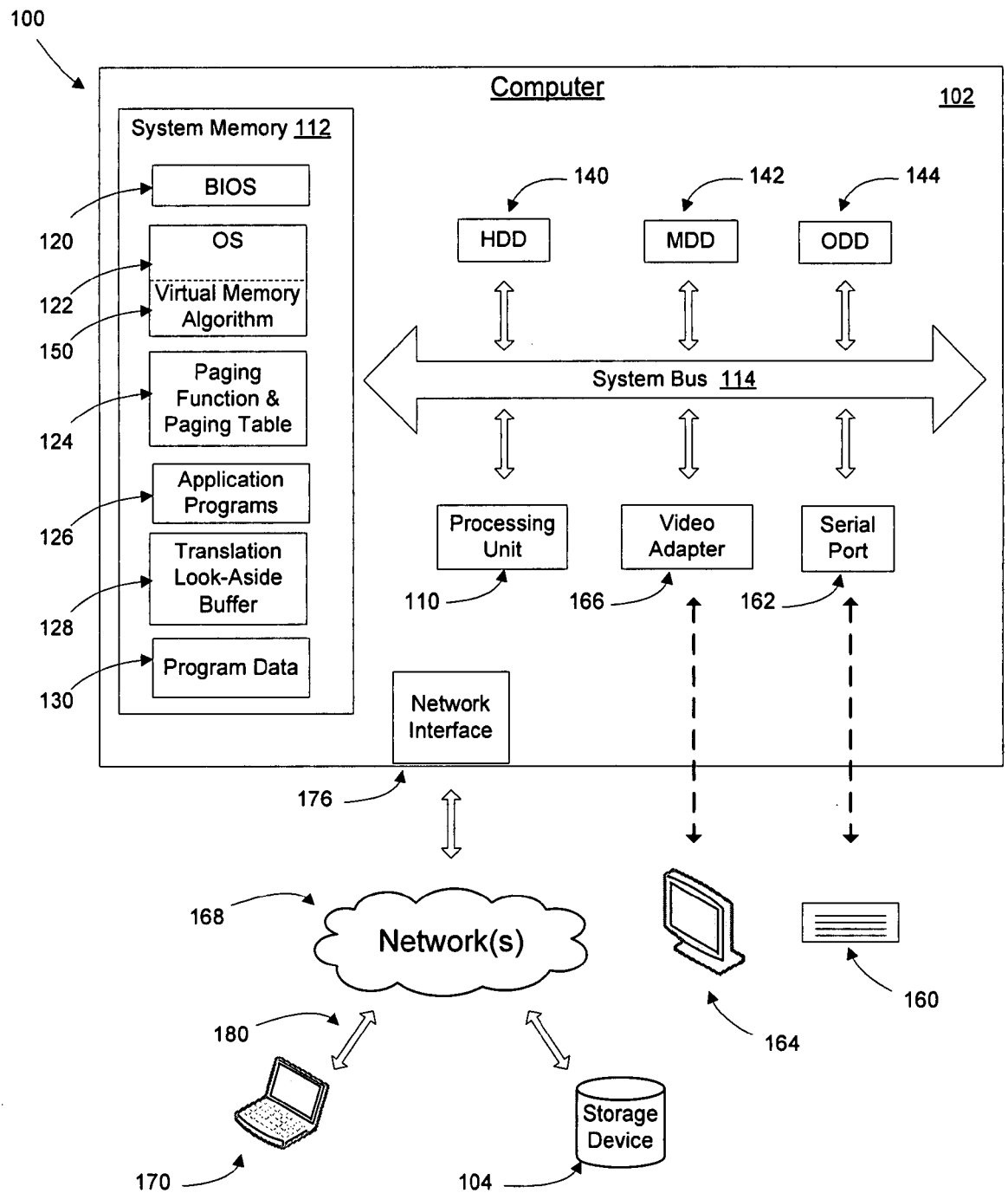
FIG. 1 is an exemplary computer system in accordance with an exemplary embodiment.

FIG. 1 is a block diagram of a computer system 100 in accordance with an exemplary embodiment. In general, the computer system 100 includes at least one computer 102 and one or more storage devices 104. The computer 102 comprises one or more processing units 110, a system memory 112, and a system bus 114 that operatively couples various system components, including the system memory to the processing unit 110. The processing unit can include one or more processors, such as a single central-processing unit (CPU) or a plurality of processing units, commonly referred to as a parallel processing environment.

The system bus 114 can be any of several types of bus structures, such as a memory bus or memory controller bus, a peripheral bus, and a local bus using any of a variety of bus architectures. Further, by way of example, the system memory 112 includes, but is not limited to, read only memory (ROM) and random access memory (RAM) having a basic input/output system (BIOS) 120, an operating system (OS) 122 having a virtual memory algorithm 150, paging function and paging table 124, application programs 126, translation look-aside buffer 128, and program data 130.

The computer 102 further includes a hard disk drive (HDD) 140 for reading from and writing to a hard disk, a magnetic disk drive (MDD) 142 for reading from and writing to a removable magnetic disk, and an optical disk drive (ODD) 144 for reading from or writing to a removable optical disk, such as a compact disk (CD), digital video disk (DVD), or other optical media. The drives and their associated computer-readable media provide nonvolatile storage of computer-readable instructions, data structures, program modules and other data for the computer 102. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A user enters commands and information into the computer 102 through one or more input devices, such as a keyboard 160. The keyboard and other devices are connected to the processing unit 110 through a serial port interface 162 that is coupled to the system bus, but can be connected by other interfaces, such as a parallel port or a universal serial bus (USB). A monitor 164 or other type of display device is also connected to the system but 114 through an interface, such as a video adapter 166.

In one exemplary embodiment, the computer 102 uses a network interface 176 to connect to one or more networks 168 using logical connections to one or more remote computers, such as a remote computer 170. These logical connections are achieved by a communication device coupled to or part of the computer 102. In one embodiment, the remote computer 170 includes one or more of another computer, a server, a router, a network personal computer (PC), a client, a peer device, or other network node.

By way of example, network 168 includes one or more of the internet, local area network (LAN), wide area network (WAN), etc. Communications links 180 are shown in the figure to represent communication paths or couplings between hosts, computers, storage devices, etc. By way of example, such links include one or more small computer system interface (SCSI) buses and/or interfaces. Further, in a networked environment, program modules depicted relative to the computer 102, or portions thereof, can be stored in the remote memory storage device or other remote locations. It is appreciated that the network connections shown are exemplary and other means of and communications devices for establishing a communications link between the computers may be used.

Embodiments in accordance with the present invention are not limited to any particular type or number of data bases and/or host computer systems. The host computer system, for example, includes various portable and non-portable computers and/or electronic devices. Exemplary host computer systems include, but are not limited to, computers (portable and non-portable), servers, main frame computers, distributed computing devices, laptops, and other electronic devices and systems whether such devices and systems are portable or non-portable.

In one embodiment, the system memory 112 includes a paging function and paging table 124. The page table is a data structure used by the operating system to store mappings between virtual addresses and physical addresses. The page table contains data or entries recording the assignment of pages of physical memory to corresponding virtual address ranges. The paging function is an operating system function that assigns real memory addresses to pages brought in from storage, selects pages to be paged out, and maintains the page table.

In one embodiment, the processor uses an address translation mechanism for translating virtual addresses generated by the processor to real addresses for accessing memory. By way of example, the address translation mechanism includes translation logic for translating a virtual address to a real address using data in a page table entry and at least one translation look-aside buffer (TLB) 128. The TLB is a cache of page table data used to increase speed of virtual address translations. The cache includes entries for the page table for translating virtual addresses to physical addresses.

By way of illustration, the processing unit 110 generates virtual addresses that are provided to the TLB 128. Upon receiving a virtual address to be translated, address translation mechanism searches for the required address in TLB 128. If a match occurs, then the address is quickly known. If no match occurs, then the translation proceeds via the page table.

One embodiment provides a virtual address hashing method to evenly distribute page table entries throughout a hash table. Exemplary embodiments reduce the likelihood that a collision in the hash index will occur due to different applications generating a same hash index for mapping virtual addresses to physical addresses. As such, virtual addresses from different applications receive different has indexes.

For a hash table implementation of the page table, the optimal size of the hash table is equal to the number of pages of physical memory (one hash table entry per page) so that the average hash chain length is 1. In general, even though the virtual address space is 64-bit, most applications' virtual addresses are smaller than 64 GB (gigabyte). The result is a common case where the upper 28 bits of the virtual address that is used to generate the hash index are 0 preventing the standard primary hashing function from generating large hash indices. This causes an under-utilization of the hash table and system performance degradation due to the uneven distribution of hash table entries. For example, in some processors with a 4 KB (kilobyte) page size, the hashing function used by the specialized hardware to access the page table is able to generate hash indices only up to 16 million in the common case where the upper 28 bits are 0. Consequently the system will have good response times during page fault resolution with physical memory sizes up to 64 GB. The performance, however, will decrease as memory size increases beyond 64 GB as hash chains grow in length.

In a system with a large amount of physical memory, the optimal size of the hash table is often at least two or more times the maximum hash index that can be generated by the standard primary hashing function in the common case where the upper 28 bits of the virtual address are 0.

Exemplary embodiments provide a method to distribute page table entries relatively uniformly throughout this large hash table. One embodiment utilizes two constraints. First, the primary hashing function remains the same as that used by specialized hardware that also accesses the hash table. Second, the method used to distribute the page-table entries throughout the hash table should be efficient.

One embodiment provides a two stage hashing algorithm. Henceforth, "effective maximum index" is used to refer to the maximum hash table index that can be generated by the standard primary hashing function in the common case where the upper 28 bits of the virtual address are 0.

In a first stage, the standard primary hashing function is applied; if the hash index generated is already larger than the effective maximum index, then the hash index is used as is. To avoid the over-usage of the lower portion of the hash table, the large hash table is considered to consist of multiple chunks of smaller hash tables each of whose size is equal to the effective maximum index. Effectively the index generated by the primary hashing function already gives the offset into each chunk of the hash table.

To evenly distribute the page table entries over the entire hash table, the page table entries are randomly assigned to a chunk. In order to effect an even distribution, one embodiment selects the chunk.

One embodiment uses part of the virtual address itself to select the chunk number. The number of bits to use depends upon the number of chunks that make up the large hash table, which is calculated by the large hash table size divided by the effective maximum index multiplied by the size of each entry. The number of bits used will be that necessary to represent the number of chunks. For example, if the hash table will have 16 chunks, or is 16 times larger than the effective maximum index, the number of bits from the virtual address that would be used to specify the chunk index is 4 bits, respectively. Since the virtual address reference itself is random enough, any set of 4 bits starting from bit 12 (assuming a 4K page size) to bit 35 is adequate. Due to the temporal locality of memory references, however, one embodiment uses references within the same locality to map into the same chunk in order to improve performance by reducing cache misses. By way of example, assuming that the average working set is 4 MB (megabytes), bits 22+n−1 to bit 22 are used as the chunk index where n is the number of bits required to index the chunk as mentioned above.

Quantitatively, one exemplary embodiment uses the following index algorithm:

```
HashIndex = HashFunction(VA);
If (Hashindex < EffectiveMaximumIndex)
{ChunkIndex = (VA & ChunkBitMask) >> 22;
 HashIndex = (ChunkIndex << NumberBitsEffectiveMaximumIndex) |
HashIndex;}
```

Here, ChunkBitMask is a bit mask of all 1s starting from bit 22+n−1 to bit 22 and the rest 0s, and NumberBitsEffectiveMaximumIndex is the number of bits to represent the effective maximum index. For example, a processor with a 4K page size would have a chunk size of 512 MB (16 M entries*32 bytes/entry). For 1 TB (terabyte) of memory, the optimal large hash table size would be 8 GB. The large hash table size is 16 times bigger than the effective maximum index, so n would 4. ChunkBitMask would then be 0x3c00000 (assuming a working set size of 4 MB) and NumberBitsEffectiveMaximumIndex would be 24 (number of nonzero bits, 36, minus the number of bits necessary to represent the page size, 12).

In this way, the primary hashing function is used while being able to quickly distribute the entries throughout the large hash table.

Figure 2:
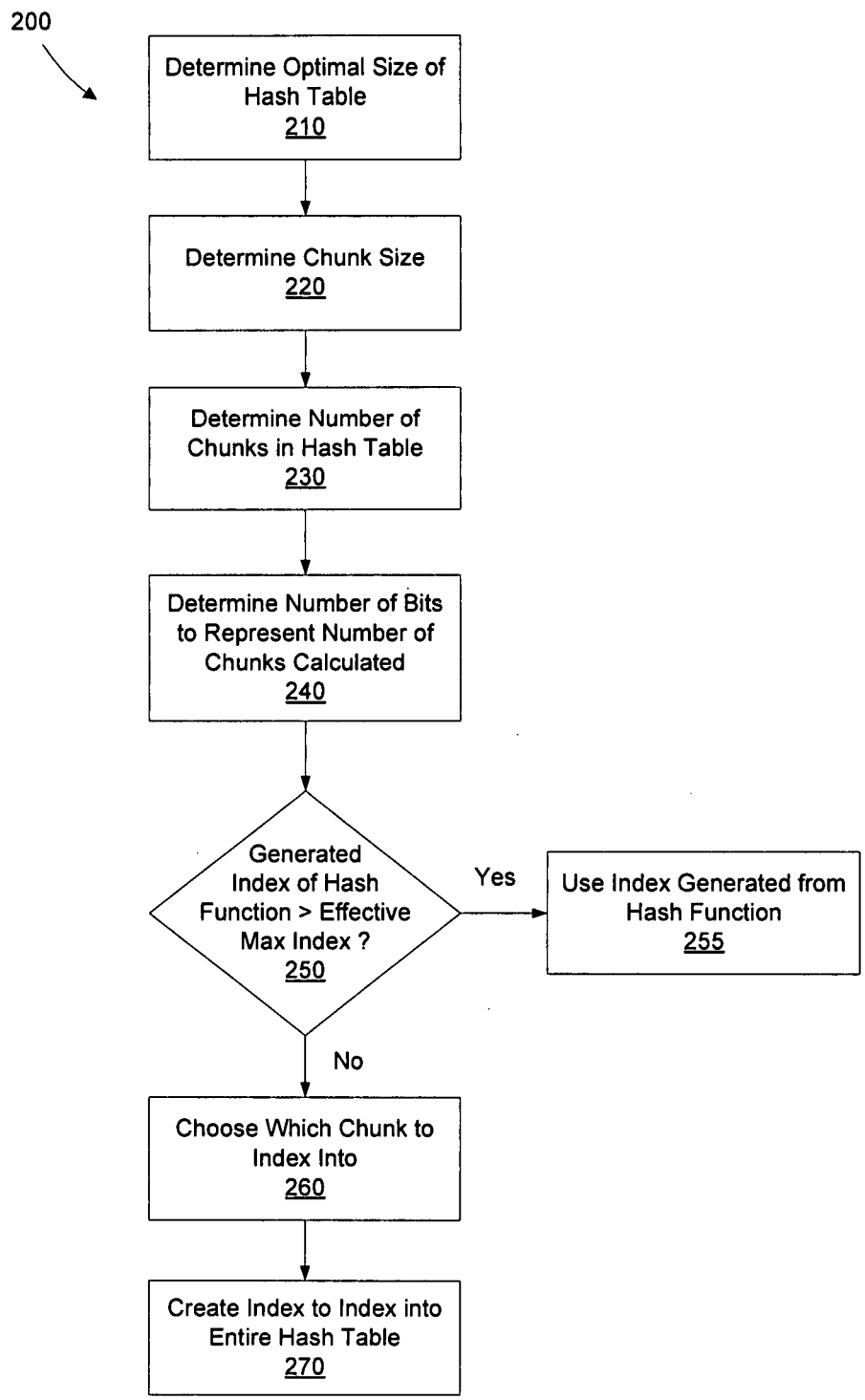
FIG. 2 is a flow diagram for virtual address hashing in accordance with an exemplary embodiment.

FIG. 2 is a flow diagram 200 for virtual address hashing in accordance with an exemplary embodiment.

According to block 210, a determination is made of the optimal size of the hash table. In one embodiment, the size of the hash table is equal to the physical memory divided by the page size times each entry size in the page. By way of example, the following equation is used:

$$\text{Size Hash Table} = ((\text{size physical memory})/(\text{page size in system})) * (\text{each entry size in byte}).$$

According to block 220, the size of the chunk is determined. In one embodiment, the chunk size is determined by the maximum address space size used by an average application. For example, the chunk size is based on a statistical average of the maximum size of address spaces used by applications. By way of example, the following equation is used:

$$\text{Chunk Size} = ((\text{average maximum address space size used of an average application})/(\text{page size})) * (\text{size of entry in hash table or the number of bytes per entry}).$$

According to block 230, the number of chunks in the hash table is determined. In one embodiment, the number of chunks in the hash table is equal to the optimal size of the hash table calculated in block 210 divided by the chunk size calculated in block 220. By way of example, the following equation is used:

$$\text{Chunks in Hash Table} = (\text{optimal size of hash table})/(\text{chunk size}).$$

According to block 240, a determination is made of the number of bits to represent the number of chunks calculated in block 230. In one embodiment, the number of bits equals the log of the number of chunks in the hash table to the base 2. By way of example, the following equation is used:

$$\text{Number of Bits} = \log_2((\text{optimal size of hash table})/(\text{chunk size})).$$

According to block 250, a question is asked whether the generated index of the hash function is greater than the effective maximum index (i.e., the number of entries in each chunk)? If the answer to this question is "yes" then flow proceeds to block 255 wherein the index generated from the hash function is used. If the answer to this question is "no" then flow proceeds to block 260 wherein a chunk is chosen to index into.

The chunks to index into are determined by using the number of bits calculated in block 240. This number of bits is taken from the virtual address. For example, take 22 bits to 22+(n−1), where n=4, then have bits 22, 23, 24, and 25.

According to block 270, create an index to index into the entire hash table.

In one exemplary embodiment, the method is part of operating system code that manages translation of virtual addresses to physical addresses. For example, the method includes one or more algorithms in the virtual memory subsystem of the operating system.

As used herein, a "virtual address" is an address that identifies a virtual (nonphysical) entity. Further, the term "virtual memory" means virtual memory addresses (rather than real memory addresses) that used to store instructions and data. Virtual memory is an addressing scheme implemented in hardware and software that enables non-contiguous memory to be addressed as if it were contiguous. Further a "physical address" is the actual address presented to the main or system memory in a virtual memory system, whereas the virtual address is generated by the processing unit. Virtual addresses are translated into physical addresses by the memory management unit, paged memory management unit, or address translation mechanism.

As used herein, a "hash table" is a data structure that associates keys with values so that given a key a corresponding value can be found. The key is transformed with a hash function (i.e., method or algorithm to transpose data to create a fingerprint or hash value) into a hash value (i.e., a number that is used to index into an array to locate a desired location or bucket where the value should be). Hash tables enable fast lookup of a data record given a key and provide minimal collisions.

In one exemplary embodiment, one or more blocks in the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of the handheld portable electronic device) and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of software execution, comprising:
   calculating a chunk size for a hash table based on a size of an average address space for plural applications;
   using a size of the hash table and the chunk size to generate an index for a hash function;

distributing page table entries uniformly throughout the hash table.

2. The method of claim 1 further comprising, reducing a likelihood that a collision in the hash table occurs due to different applications generating a same hash index for mapping virtual addresses to physical addresses.

3. The method of claim 1 further comprising, calculating the size of the hash table to be at least two times larger than a maximum hash index generated by a hashing function.

4. The method of claim 1 further comprising, using the hash function to generate hash values, the hash function being used by hardware that accesses the hash table.

5. The method of claim 1 further comprising, generating the hash table using the hash function having an upper twenty-eight (28) bits of virtual address equal to zero.

6. The method of claim 1 further comprising, randomly assigning the page table entries to chunks in order to evenly distribute the page table entries over the hash table.

7. The method of claim 1 further comprising, generating an index by the hash function to provide an offset into chunks of the hash table.

8. A non-transitory computer readable medium having instructions for causing a computer to execute a method, comprising:
   generating a hash table index with a hashing function;
   generating a maximum index;
   comparing the hash table index to the maximum index;
   distributing page table entries uniformly throughout a hash table to avoid a collision of two applications generating equivalent hash indexes;
   calculating a chunk size in the hash table by determining an average address space size of plural applications; and
   dividing a size of the hash table by the chunk size to calculate a number of chunks in the hash table.

9. The non-transitory computer readable medium of claim 8, wherein the size of the hash table is equal to a size of physical memory divided by page size multiplied by entry size in a page.

10. The non-transitory computer readable medium of claim 8 further comprising, calculating a number of bits to represent a number of chunks in the hash table.

11. The non-transitory computer readable medium of claim 8 further comprising, comparing an index of a hash function to a number of entries in plural chunks.

12. The non-transitory computer readable medium of claim 8 further comprising, determining a number of bits to represent a number of chunks in the hash table, wherein the number of bits equals a log of a size of the hash table divided by chunk size.

13. A computer system, comprising:
   an operating system executing plural applications and having a virtual indexing algorithm;
   a processor that executes the virtual indexing algorithm to:
      evenly distribute page-table entries throughout a hash table to prevent the plural applications from generating a same hash index for mapping virtual addresses to physical addresses; and
      calculate a chunk size for the hash table based on a size of an average address space for the plural applications.

14. The computer system of claim 13, wherein the size of the hash table is equal to a number of pages of physical memory having an average hash chain length of one.

15. The computer system of claim 13, wherein the processor further executes the virtual indexing algorithm to calculate a size of the hash table for referencing data between virtual and physical addresses.

16. The computer system of claim 13, wherein the processor further executes the virtual indexing algorithm to assign the page-table entries to chunks in order to more evenly distribute the page-table entries over the hash table.

17. The computer system of claim 13, wherein the processor further executes the virtual indexing algorithm to choose a chunk size in the hash table by determining an average address space size of plural applications.

* * * * *